3,222,349
METHOD FOR SEPARATING HYDROCARBONS
Charles B. Holder, Beacon, N.Y., assignor to Texaco Inc., New York, N.Y., a corporation of Delaware
No Drawing. Filed Oct. 11, 1961, Ser. No. 144,316
7 Claims. (Cl. 260—96.5)

The present invention relates to a method for separating hydrocarbons and, more specifically, to a method for separating the isomers of diisopropylbenzene to produce a paradiisopropylbenzene product.

Diisopropylbenzene occurs in three isomeric forms, namely ortho-, meta-, and para-diisopropylbenzene, which are generally produced concurrently in conventional diisopropylbenzene processes. Characteristically, these isomers are similar in their physical properties and boil within a relatively narrow temperature range.

Paradiisopropylbenzene is particularly valuable for the manufacture of terephthalic acid and paradihydroxybenzene if it can be produced either in an enriched fraction or substantially free of its isomers. However, attempts to concentrate paradiisopropylbenzene by distillation from an isomeric mixture of the diisopropylbenzenes has been found to be economically unattractive due to the closeness of the boiling points of the isomers.

A method has now been discovered for separating paradiisopropylbenzene from admixture with at least one other isomeric diisopropylbenzene to produce a fraction that is enriched in or is essentially paradiisopropylbenzene. This method is based on the discovery that paradiisopropylbenzene alone among the diisopropylbenzene isomers under suitable conditions will form a complex or an adduct with thiourea which is readily separated from the mother liquor or mixture of the isomers not adducted with thiourea.

In accordance with this invention, a feed mixture of diisopropylbenzene isomers is admixed with thiourea within effective proportions for adduct formation to produce adducts consisting of thiourea and paradiisopropylbenzene. This adduct is crystallized out of the mother liquor as described hereinbelow and is physically separated and decomposed to yield paradiisopropylbenzene.

The composition of the feed mixture, i.e. the proportions of the diisopropylbenzene isomers present therein is not considered critical in this process. It is believed that as long as the paradiisopropylbenzene isomer is present, adducts can be formed and separated from the mother liquor solution that is formed. It will be appreciated, however, that the process is most effective when the feed contains a relatively high proportion of paradiisopropylbenzene, preferably at least 25% or more. The propylene alkylation of benzene produces a mixture of isomers in the approximate proportions of 1:3:4 of ortho-, meta-, and paradiisopropylbenzenes respectively and is highly suitable for the instant separation process.

The adduct-forming agent in this process is thiourea. The thiourea may be employed in many ways. For example, it may be dissolved in a lower aliphatic alcohol, such as one having the formula ROH in which R is an alkyl radical having 1 to 6 carbon atoms. The alcohol solution is preferably a saturated solution. The thiourea can also be employed in an alcohol slurry, a water-alcohol slurry and a saturated water-alcohol solution. The thiourea may also be employed as a solid in the presence of a small amount of alcohol or water. The preferred adduct-forming agent is a saturated methyl alcohol solution of thiourea.

This process is conducted by combining the isomeric mixture of diisopropylbenzenes with the thiourea within suitable proportions and at a temperature at which adduct formation can be effected. A suitable temperature for this process is from about 32° F. to about 150° F. with a mixing temperature about 68° F. or room temperature being preferred, followed by chilling as necessary to promote adduct separation. There is no advantage realized from employing higher mixing temperatures in this step.

The proportion of thiourea which is admixed with the mixture of diisopropylbenzene isomers to form the thiourea-paradiisopropylbenzene adduct is not a critical matter. The most efficient separation is realized when the thiourea is added in somewhat of an excess over the amount to form an adduct with all of the paradiisopropylbenzene present. Thiourea and paradiisopropylbenzene form adducts in the approximate molar proportions of 2:1 to 6:1.

It is preferred to form the adduct from a solution of the isomers and of the thiourea. In this case, adduct formation is induced by gradually chilling the well-mixed mother liquor solution. The temperature at which the adduct crystallizes out is dependent on the concentration of the paradiisopropylbenzene in the mother liquor. Generally, the adduct will crystallize out at a temperature about 32° F. but this will vary with specific circumstances. In an initial experiment, a thiourea adduct was formed when 20 ml. of high purity paradiisopropylbenzene and 200 ml. of a saturated methanolic thiourea solution were mixed at room temperature and cooled slowly to 32° F.

As a rule, some of the other isomers in the diisopropylbenzene mixture will be occluded in the thiourea and paradiisopropylbenzene adduct that is separated. It is to be noted, however, that the product recovered after decomposing the complex is a substantially enriched fraction of paradiisopropylbenzene. The mother liquor can be repeatedly resaturated with thiourea to produce additional batches of adduct. The batches of adduct can be combined before treating the adducts for recovery of the paradiisopropylbenzene. Alternatively, and before the recovery procedure, individual or combined batches of adduct separated from the mother liquor can be recycled through the adduct forming step to ultimately produce a further enriched or essentially paradiisopropylbenzene product.

The crystallized adduct is separated from the mother liquor by any convenient means. Filtering, settling, centrifuging and similar separation methods are all effective for separating the adduct from the mother liquor.

The adduct separated from the mother liquor is decomposed in the steps leading to the recovery of the paradiisopropylbenzene. Specifically, the adduct is cleaved by heating it to a temperature at which the bonding forces in the adduct are destroyed and the paradiisopropylbenzene component is liberated. Generally, a temperature above about 200° F. will liberate the paradiisopropylbenzene from the adduct. Alternatively, the adduct can be decomposed by using a solvent such as water or methyl pentane or even an excess of the thiourea solution or solvent thereof. The thus-freed paradiisopropylbenzene is dried and purified from solvent by conventional distillation.

Minor amounts of an auxiliary liquid or liquid mixture aside from the principal solvent may at times be employed in the mother liquor to promote the formation of the adduct. While the reason that these liquids or mixtures function as promoters is not fully understood, they improve the efficiency of the process and promote adduct formation under less than ideal conditions. A particularly effective promoter mixture consists of equal amounts of methylethylketone and benzene. When a promoter is employed with a mother liquor it should be added in the proportion of about 1 to 5% by volume.

The following example illustrates the practice of this invention:

Example 53 grams of a mixture of ortho-, meta-, and paradiisopropylbenzene was employed. This mixture consisted of about 26% of ortho-, 29% of meta-, and 45% of paradiisopropylbenzene.

A saturated methanolic thiourea solution was admixed with the diisopropylbenzene mixture in the proportion of 15 parts by volume of saturated methanolic thiourea solution to 6 parts of the paradiisopropylbenzene contained in the isomeric diisopropylbenzene mixture. A small amount, 0.5% by volume, of a 1:1 benzene-methylethyl ketone solution was also added to promote formation of the adduct. This mixture was then chilled.

The adduct separated at about 32° F. and was filtered off. The mother liquor was rewarmed to room temperature, resaturated with additional methanolic thiourea, chilled, and additional adduct filtered off. This cycle was repeated, each cycle producing additional batches of adduct.

Six batches of adduct as produced above were combined and decomposed by heat at 212 F. under 1–2 microns of pressure. The liberated paradiisopropylbenzene was dried and purified by vacuum transfer. Infrared analysis showed the product to consist of approximately 80% of paradiisopropylbenzene, 10% of orthodiisopropylbenzene, and 10% of metadiisopropylbenzene. Further treatment of this product results in a purer product.

Obviously, many modifications and variations of the invention, as hereinbefore set forth, may be made without departing from the spirit and scope thereof, and therefore such limitations should be imposed as are indicated in the appended claims.

I claim:

1. A method for recovering paradiisopropylbenzene from admixture with at least one other isomeric diisopropylbenzene which comprises contacting said mixture with thiourea to form an adduct of said thiourea and said paradiisopropylbenzene, separating said adduct from said mixture, decomposing said adduct to separate said paradiisopropylbenzene from said thiourea and recovering said paradiisopropylbenzene.

2. A method according to claim 1 in which said mixture is contacted with saturated lower aliphatic alcohol solution of thiourea to form an adduct-forming mother liquor at a temperature in the range from about 32° F. to about 150° F.

3. A method according to claim 2 in which said adduct is formed by cooling said mother liquor to about 32° F.

4. A method according to claim 1 in which said adduct of said thiourea and said paradiisopropylbenzene is decomposed by heating to a temperature above about 200° F.

5. A method for recovering paradiisopropylbenzene from an isomeric mixture of ortho-, meta-, and paradiisopropylbenzenes which comprises contacting said mixture with a saturated alcohol solution of thiourea in the liquid phase to form an adduct-forming reaction mixture, said contacting being conducted at a temperature in the range from above 32° F., to 150° F., cooling said reaction mixture to a temperature about 32° F. to form an adduct between said thiourea and said paradiisopropylbenzene, separating adduct from said reaction mixture, decomposing said adduct by heating to a temperature above about 200° F. to separate said paradiisopropylbenzene from said thiourea and recovering said paradiisopropylbenzene.

6. A method for recovering paradiisopropylbenzene from an isomeric mixture of ortho-, meta-, and paradiisopropylbenzenes in which said paradiisopropylbenzene amounts to at least about 25% by volume, which comprises contacting said mixture with a saturated methyl alcohol solution of thiourea at about room temperature to form an adduct-forming reaction mixture, cooling said reaction mixture to a temperature about 32° F. to form an adduct between said thiourea and said paradiisopropylbenzene, separating said adduct from said mixture, decomposing said adduct by heating to a temperature above about 200° F. to separate said paradiisopropylbenzene from said thiourea and recovering said paradiisopropylbenzene.

7. A method for recovering paradiisopropylbenzene from an isomeric mixture of ortho-, meta-, and paradiisopropylbenzenes which comprises contacting said mixture with a saturated alcohol solution of thiourea in the liquid phase to form an adduct-forming reaction mixture, said contacting being conducted at a temperature in the range from above 32° F. to 150° F., cooling said reaction mixture to a temperature about 32° F. to form an adduct between said thiourea and said paradiisopropylbenzene, separating adduct from said reaction mixture, decomposing said adduct by the addition of a solvent selected from the group consisting of water, methylpentane, a lower aliphatic alcohol and saturated alcohol solution of thiourea, and recovering said paradiisopropylbenzene.

References Cited by the Examiner

UNITED STATES PATENTS 2,761,858   9/1956   Hettinger et al. _____ 260—96.5

OTHER REFERENCES

B. Schrader et al.: Simple Arrangement for Obtaining Raman Spectra of Solids, Fresenius' Zeitschrift für Analytische Chemie, vol. 170, page 55 relied on, 1959.

German application 856,296, W. Schlenk, Nov. 20, 1952 (3 pp. spec. no dwg.).

ALPHONSO D. SULLIVAN, *Primary Examiner.*